United States Patent
Boerger et al.

(10) Patent No.: US 12,457,655 B2
(45) Date of Patent: Oct. 28, 2025

(54) METHOD AND SYSTEM FOR NEAR-FIELD PAIRING ON A CURRENT LIMITED PORTABLE COMMUNICATION DEVICE

(71) Applicant: MOTOROLA SOLUTIONS, INC., Chicago, IL (US)

(72) Inventors: Mark A Boerger, Plantation, FL (US); David J Ley, Plantation, FL (US); Ellis A Pinder, Davie, FL (US); Kathleen Culligan, Downers Grove, IL (US); Liang Xu, Weston, FL (US); Daniel Grobe Sachs, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 440 days.

(21) Appl. No.: 18/315,236

(22) Filed: May 10, 2023

(65) Prior Publication Data

US 2024/0381460 A1 Nov. 14, 2024

(51) Int. Cl.
*H04W 76/15* (2018.01)
*H04W 72/541* (2023.01)
*H04W 72/56* (2023.01)
*H04W 76/14* (2018.01)

(52) U.S. Cl.
CPC ......... *H04W 76/15* (2018.02); *H04W 72/541* (2023.01); *H04W 72/56* (2023.01); *H04W 76/14* (2018.02)

(58) Field of Classification Search
None
See application file for complete search history.

(56) References Cited

U.S. PATENT DOCUMENTS

| | | | | |
|---|---|---|---|---|
| 8,666,313 | B2 * | 3/2014 | Preston | H04W 12/50 370/310 |
| 9,209,867 | B2 | 12/2015 | Royston | |
| 9,526,072 | B1 | 12/2016 | Simms et al. | |
| 10,924,925 | B2 | 2/2021 | Sachs et al. | |
| 2021/0036740 | A1 | 2/2021 | Steffan et al. | |
| 2024/0381460 | A1 * | 11/2024 | Boerger | H04W 72/541 |

* cited by examiner

*Primary Examiner* — Christopher T Wyllie
(74) *Attorney, Agent, or Firm* — Barbara R Doutre

(57) ABSTRACT

A method and system for dynamically managing wireless pairing of a portable radio device and an accessory are provided. A multi-stage wireless pairing mode applies a first BT pairing stage that utilizes NFC and BT communication, while disabling low-priority, high-current communications of the portable radio device. The second BT pairing stage turns off the NFC pairing, maintains BT, and re-enables the low-priority, high-current communications. Any occurrence of a high-priority, high-current mission critical event disables the multi-stage pairing mode and services the event. User notifications and are dynamically managed to avoid user interference during the pairing.

23 Claims, 7 Drawing Sheets

METHOD AND SYSTEM FOR NEAR-FIELD PAIRING ON A CURRENT LIMITED PORTABLE COMMUNICATION DEVICE

FIELD OF THE INVENTION

This application pertains to portable communication devices and more particularly to pairing operations of a current limited portable communication device.

BACKGROUND OF THE INVENTION

Portable battery powered communication devices, particularly land mobile radio (LMR) devices, are often utilized in law enforcement, fire rescue, and other public safety operations. Such devices are often used in conjunction with an accessory device. Typically, the accessory device is coupled to the portable LMR device via a wired interface. There is an increased interest in having the accessory device wirelessly pair to the radio device, and more particularly to having the accessory device pair to the portable radio device using near-field communication (NFC) pairing. However, NFC pairing requires substantial current making it very challenging to use with portable radio devices, which are also high-current devices. Unlike mobile cell phone devices which provide an applications processor with touch screen and communication functions through long term evolution (LTE), WiFi, Bluetooth, and others, portable radio devices have additional high current operations, such as LMR transmit, high volume receive audio, and others, which if combined with NFC pairing may exceed the instant current-sourcing capability of the device. Due to the mission critical nature of radio devices, it is not acceptable to defer high-current transmissions during NFC operation. Additionally, some radio devices are "type certified" for hazardous environments, which have even more stringent requirements for maximum current (e.g. UL Div I HazLoc, NFPA, ATEX, and IECEx to name a few).

Accordingly, there is a need to address the aforementioned challenges so that a portable radio device may pair to an accessory using NFC without negatively impacting operational characteristics of the radio device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
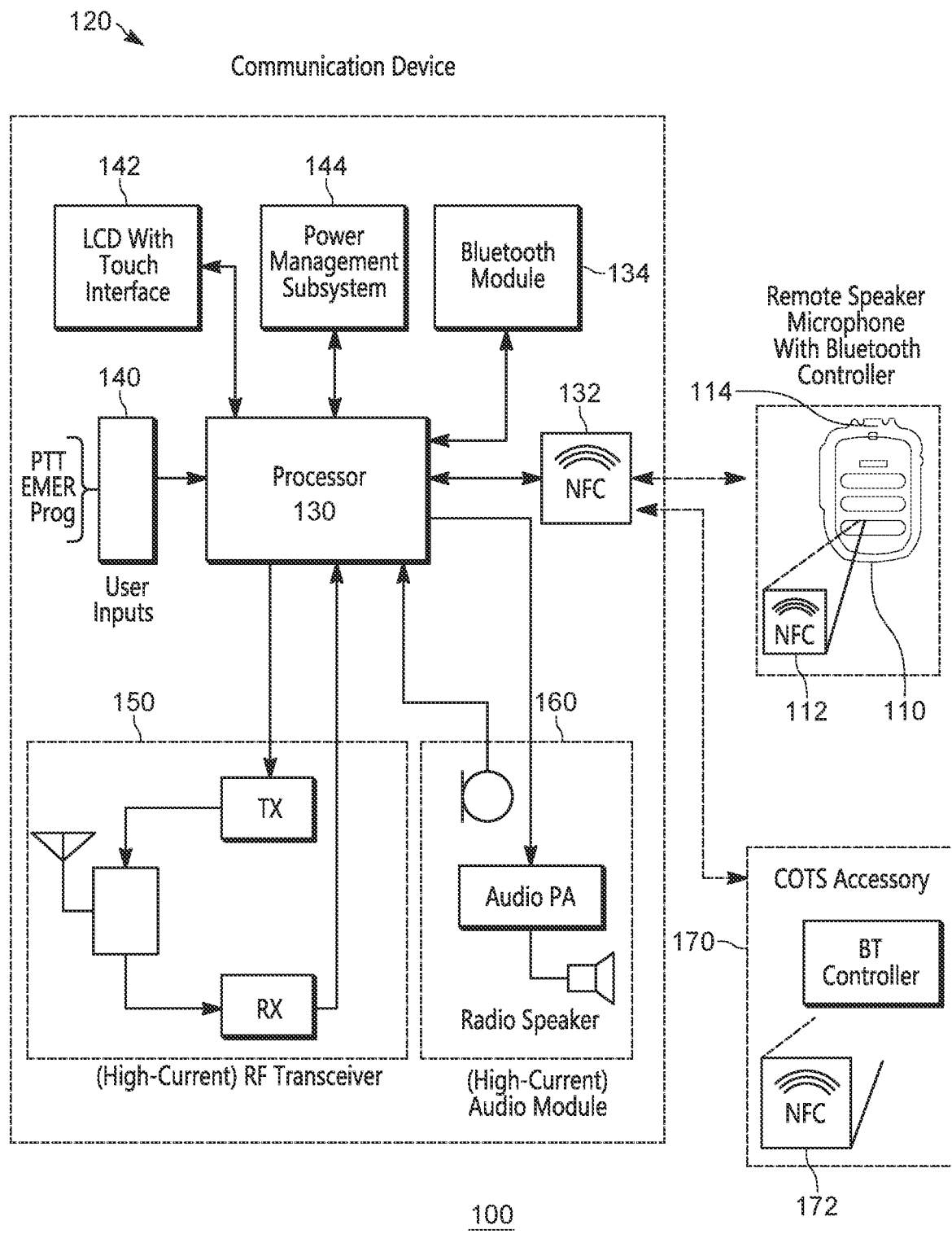
FIG. 1 is a block diagram of a portable communication device and accessory formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Bluetooth wireless pairing involves the association of two devices to allow communication, with the pairing process further including the creation of a shared, secret "link key" to ensure confidentiality of the data sent between the two paired devices. The Bluetooth (BT) standard allows various types of pairing, with tradeoffs between security, user convenience, and device hardware requirements. Near-field communication (NFC) touch pairing is highly desirable because it provides a simplified user experience for Bluetooth pairing and also provides enhanced security, as compared to longer distance, far-field wireless pairing where the devices are separated and more susceptible to interception. An NFC module typically includes short range field generator, such as a 13.56 MHz field generator, that operates at extremely short distances (less than 10 cm) making interception of the link key during the pairing process extremely difficult and therefore highly advantageous.

Briefly, there is provided herein a method and communication system for dynamically managing wireless pairing of a current constrained portable radio device to an accessory. A multi-stage wireless pairing mode applies a first BT pairing stage that utilizes near-field communication (NFC) and Bluetooth (BT) communications, while disabling low-priority, high-current communications of the portable radio device. A second BT pairing stage turns off the NFC pairing and re-enables the low-priority, high-current communications. Once paired, the devices may wirelessly communicate over BT. Any occurrence of a high-priority, high-current event, such as a mission critical LMR operation, disables the pairing and services the event, thereby avoiding any negative impact to mission critical communications. The touch pairing is accomplished via a NFC module during the first BT pairing stage. Dynamically managed user notifications promote smooth pairing though the multi-stage pairing process so as to avoid user interference with the pairing. Users may interrupt and cancel pairing during the first BT pairing stage, if desired, via user-initiated inputs. However, user inputs to cancel during the second BT pairing stage are not permitted (with the exception of mission critical operations), thereby ensuring smooth pairing of the two devices.

The embodiments are well suited to type certified radio devices, such as portable land mobile radio (LMR) devices and/or converged radio devices that provide LMR functionality with other non-LMR functionality, for example, LTE and/or WiFi functionality, where such devices need to meet limited current requirements for explosive environments. Certification for explosive environments may include for example, UL Div I HazLoc type certification, atmospheres explosibles (ATEX) certification, National Fire Protection Association (NFPA) standards, International Electrotechnical Commission System for Certification to Standards Relating to Equipment for Use in Explosive Atmospheres (IECEx) Systems, to name a few. These stringent environments require battery designs that clamp the amount of inrush peak current supplied. Additionally, as batteries age, operate in cold environments, and deplete through usage, the available peak current capacity diminishes as well. The system and method provided herein avoids undesirable workarounds, such as taking an LMR radio offline, utilizing a wired interface, or using proprietary protocols.

FIG. 1 is a block diagram of a portable communication system 100 formed and operating in accordance with some embodiments. The portable communication system 100 comprises a battery powered portable radio device 120 and a battery powered portable accessory, typically a body-worn accessory such as remote speaker microphone (RSM) 110 or a commercial-off-the-shelf (COTS) accessory 170. A COTS accessory provides other non-RSM functions, such as heart monitor, smart watch, and barcode scanner, to name a few. The portable radio device 120 may be a land mobile radio (LMR) device or a converged portable radio device that provides LMR communications along with, for example, LTE and/or WiFi communications, or other non-LMR communications. The portable radio device 120 provides mission critical LMR operations, such as scan, push-to-talk (PTT), and high power receive audio as well as non-mission critical operations, such as software applications, low power audio, and global positioning system (GPS) to name a few.

For the purposes of this application, high-priority, high-current events may include but are not limited to, mission critical operations, such as push-to-talk (PTT), emergency, and/or high-current receive audio. Low-priority, high-current events typically involve, but are not limited to, operations which require the radio to transmit acknowledgements or other background messages or transactions and/or can include call alerts, over the air rekey (OTAR), private call, and data operations, to name a few.

The radio operations are controlled via a processor 130 inter-operatively coupled to a plurality of radio inputs and modules, including a plurality of user interface inputs 140, LCD with touch interface 142, power management subsystem 144, radio frequency (RF) transceiver 150, and audio module 160. The audio module 160 may operate using normal, low-current audio in transmit and receive, as well as further provide mission-critical, high-volume (very loud) audio to the speaker in a high-current receive mode. For the purposes of this application, the audio module 160 may be referred to as high-current audio module 160 when providing high-current receive audio. The plurality of user interface inputs 140 may include, but are not limited to, push-to-talk (PTT) button, emergency button, programmable buttons, scan function, microphone input, and a touch interface portion of LCD 142. The microphone input may further be routed to an automatic speech recognition (ASR) engine of processor 130. The processor 130 is configured to manage the LMR communications and the non-LMR communications.

The RSM accessory 110 includes a speaker, a microphone (not shown), and an external LED 114. The RSM accessory 110 is provided with BT functionality via a Bluetooth module (not shown) and further includes an NFC module 112 for NFC operation. The communication system of FIG. 1 may utilize any NFC communication protocol, including those specific to NFC Forum Bluetooth Handover [Bluetooth® Secure Simple Pairing Using NFC, NFCForum-AD-BTSSP_1_1_2014-01-09]. The embodiments do not preclude the use of proprietary pairing protocols conveyed over NFC, or the use of other short-range, high power physical layers.

In accordance with the embodiments, portable communication system 100 enables wireless pairing of portable radio device 120 to an accessory, such as RSM 110 or COTS accessory 170, using a multi-stage wireless pairing mode, which includes touch pairing. The multi-stage wireless pairing mode includes a first BT pairing stage that uses BT and NFC communication, and a second BT pairing stage that uses only BT communication (BT-only). A portion of the touch pairing process is accomplished not over the BT module 134, but rather over the NFC module 132. The embodiments advantageously manage low-priority, high-current operations and high-priority, high-current operations throughout the pairing process in conjunction with a plurality of pairing exiting options to ensure that current limits of the current constrained portable radio device 120 are not exceeded and that mission critical communications are maintained.

The battery of the radio device 120 may have a predetermined battery capability for sourcing a predetermined current limit. Pairing of the portable radio device 120 to accessory 110 using NFC is challenging because of the high current modes that may be associated with both low-priority and high-priority events. For example, the RF transceiver 150 and audio module 160 of the radio device 120 may operate in high current modes, such as LMR transmit operation and LMR high-power receive audio respectively. These high current operations, if operated in conjunction with NFC pairing, would exceed the instant current sourcing capacity of the radio device battery. Exceeding the instant current sourcing capacity may cause portable radio device 120 to turn off, reset, or behave in some undefined manner. In accordance with the embodiments, the processor 130 of the portable radio device 120 is advantageously configured to manage a wireless pairing of the devices through the multi-stage pairing mode (also referred to as multi-stage pairing process) that ensures that radio device current limits are not exceeded and that mission critical LMR operations take priority over pairing operations.

The multi-stage pairing mode is initiated in response to one of a plurality of user-initiated inputs to the portable radio device 120. The user-initiated inputs may be enabled by, but are not limited to, a programmed button, a dedicated button, a window menu, an interface touch input on home screen or BT menu, a voice command, and/or other pre-configured input configuration to the portable radio device 120. For example, the portable radio device 120 may include a programmable software button, programmed for user selectable NFC pairing. Selectable menu options, and/or selectable touch button icons, may be provided via a touch window coupled to the LCD module 142 of portable radio device 120. For example, the LCD module 142 may control an electronic display screen that is also an input device for receiving touch inputs. Touch inputs may include, for example, fingertip tapping, hand movements or text entry to select elements on the screen. Alternatively or additionally, the portable radio device 120 may include a voice interface providing automatic speech recognition (ASR) functionality for user enabled triggering of the special NFC pairing mode.

Activation of the user-initiated multi-stage pairing mode enables NFC communication between the radio device 120 and the accessory 110 for a pairing operation. During the first BT pairing stag, during which NFC pairing takes place, the processor 130 is configured to disable low-priority, high-current operational modes of the portable radio device 120. The processor 130 is further configured to enable a NFC field generator of NFC module 132 for pairing with the NFC module 112 of the accessory 110. The processor 130 is further configured to start a NFC timeout timer (included within processor 130).

As will be described in conjunction with subsequent figures, the processor 130 may be further configured to generate a user-notification indicating active NFC pairing mode entry. The notification of pairing entry may appear on the device LCD of radio device 120 and/or include an audible notification from the radio device 120. User instructions for pairing the devices and notifications may be displayed at the radio device 120, including, for example, 'NFC pairing turned on, and hold pairing icons of devices together, and 'background transmissions temporarily disabled during pairing'.

Processor 130 may assess the overall state of portable radio device 120 and any detected events to determine if the instant current sourcing capacity may be exceeded. Operational parameters such as environment, device settings, device configuration, operating mode, active WiFi modem, and/or active LTE modem, to name a few, may all impact the current state of the device, These operational parameters may change from time to time or may be different between various instances of portable radio device 120. For example, audio module 160 may, in some cases, require greater power depending on the volume setting of the portable radio device 120. Device 120 may determine that the instant volume setting is below a threshold that would not cause the device to exceed the instant current-sourcing capacity even if the NFC field generator is enabled. Accordingly, some high-current events may be variable in nature depending on the state or context of the portable radio device. Processor 130 may dynamically adjust which radio operations are disabled during NFC pairing and which operations can be maintained based on the assessment of the overall state of the portable radio device.

In accordance with the embodiments, during the NFC pairing mode, the processor 130 is configured to monitor for high-priority, high-current events that could exceed the instant current-sourcing capability of the device, a condition that is exacerbated by the additional current requirements of the enabled NFC field generator active in NFC pairing mode. For example, a PTT or emergency activation by the user would require the RF transceiver 150 to activate for high-current far field mission-critical LMR communication. Alternatively, an incoming call may be received by the RF transceiver 150 that requires high-current audio at audio module 160. Additional high current operations may also be present in portable radio device 120.

During normal, successful pairing operations (i.e. no detection of high-priority, high-current event), then out-of-band (OOB) communication using the NFC field generator takes place as part of the active NFC pairing mode. In accordance with some embodiments, the process moves between the first BT pairing stage and the second BT pairing stage using the same continuous notifications (e.g. display 'keep devices together' and continued audible beeps) The user thus views the pairing process as monolithic, and accordingly is less inclined to operate the device during the "second BT pairing stage" in a manner that could disrupt the pairing process, such as initiating a high-priority event like a PTT press.

Upon determining that the NFC pairing is complete, the processor 130 is further configured to disable the NFC field generator and enable low-priority, high-current operations on the radio device. The radio device continues normal radio device operation, and communications can now take place between the paired radio device and accessory using in-band BT communication.

If the active NFC pairing is not completed and the timeout timer has not expired, then the NFC pairing continues while the processor 130 continues monitoring for high-priority, high-current event detection.

In response to determining that the NFC timeout timer has expired, the processor 130 is configured to disable the NFC field generator of the radio device 120 (devices not paired) and enable low-priority, high-current operations on the radio device. Normal radio device operation can take place since the radio device and accessory are not paired. The user may re-enter pairing mode using one of the aforementioned inputs or via a dialog presented to the screen.

In response to detection of a high-priority, high-current event, during the first BT pairing stage, the processor 130 is further configured to disable the NFC field generator on the portable radio device 120, and service the high-priority, high-current event. The processor 130 is further configured to enable low-priority, high-current operation modes at the radio device 120 and continue normal radio device operation, since the radio device and accessory were not paired due to pairing interruption and exit from NFC pairing mode.

Users may interrupt and cancel pairing during the first BT pairing stage, if desired, via user-initiated inputs. However, user inputs to cancel during the second BT pairing stage are not permitted (with the exception of mission critical operations), thereby ensuring smooth pairing of the two devices.

The operation of portable communication system 100 may be summarized as follows. The processor 130 of portable radio device 120 is configured to enter a multi-stage wireless pairing mode between the portable radio device and accessory, wherein the multi-stage wireless pairing mode is triggered by a user-initiated input, and the multi-stage wireless pairing mode includes a first BT pairing stage that uses BT and NFC communication, and a second BT pairing stage that uses only BT communication. The processor 130 is further configured to monitor for high-priority, high-current mission critical events during the multi-stage wireless pairing mode. The processor 130 is configured to temporarily disable low-priority, high-current operations during the first BT pairing stage. The disabling of low-priority, high-current operations allows for the high-current NFC wireless pairing to take place. Once the NFC pairing is successfully completed and the near-field generator is turned off, the processor 130 re-enables low-priority, high-current operations during the second BT pairing stage. Only BT pairing (which is low current) takes place during the second BT pairing stage which allows for the re-enablement of the low-priority, high-current operations. The processor 130 is further configured to generate one or more user notifications indicating that pairing is taking place throughout first BT pairing stage and the second BT pairing stage and a different user notification to indicate that pairing is complete after the second BT pairing stage. In accordance with the embodiments, the processor 130 is configured to exit the multi-stage wireless pairing mode under a variety of conditions. The processor 130 is configured to exit the multi-stage wireless pairing mode in response to a high-priority, high-current mission critical event occurring during either the first BT pairing stage or the second BT pairing stage and service the high-priority, high-current event. The processor 130 is configured to exit the multi-stage wireless pairing mode, and begin wireless BT communications between the portable radio device and accessory, in response to completion of both the first BT pairing stage and the second BT pairing stage.

The processor is further configured to exit the multi-stage wireless pairing mode in response to a NFC timeout timer expiring during the first pairing stage. The processor is further configured exit the multi-stage wireless pairing mode in response to a user initiated input indicative of pairing cancelation during the first BT pairing stage but not during the second BT pairing stage.

The portable radio 120 may be summarized as comprising a battery having a predetermined battery capability for sourcing a predetermined current limit; a near-field radio module 132 for wireless pairing; a far-field radio module, such as BT module 134, for wireless pairing; a user interface (such as display 142 and speaker) providing indicators (for example visual indicators and/or audible indicators) of a wireless pairing status; and a processor 130 operatively coupled to the near-field radio module and the far-field radio module and powered by the battery. In accordance with some embodiments, the processor 130 is configured to: disable low-priority, high-current (LPHC) radio operations during a first pairing stage in which a combined near-field radio module current, far-field radio module current, and LPHC radio operational current exceed the predetermined current limit of the battery; re-enable LPHC radio operations during a second pairing stage during which the near-field radio module current decreases, and wherein the combined near-field radio module current, far-field radio module current, and LPHC radio operational current do not exceed the predetermined current limit of the battery. The processor 130 is further configured to present a monolithic indicator to the user interface, such as at the display and/or speaker, throughout the first and second pairing stages.

Figure 2A:
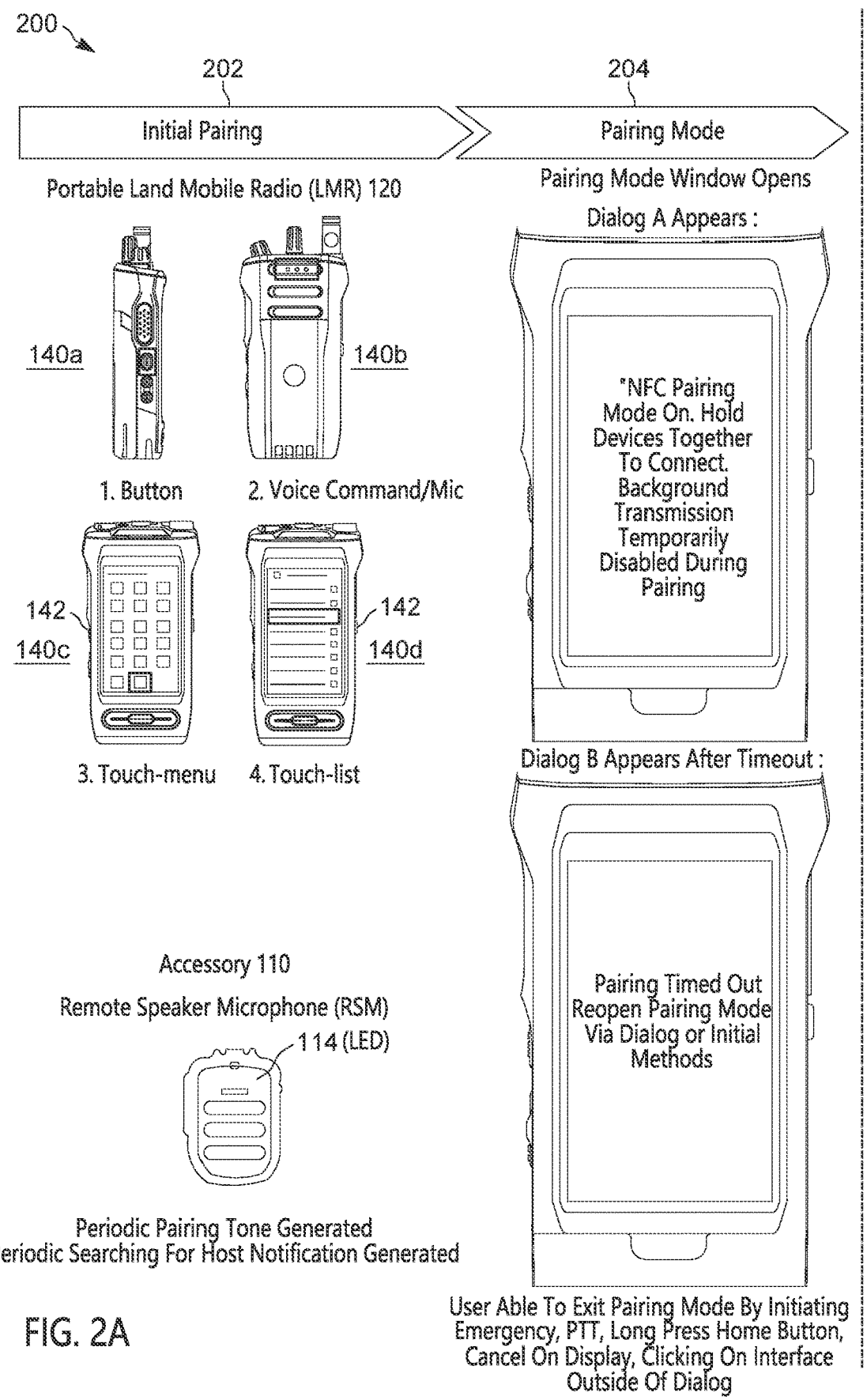
FIGS. 2A and 2B illustrate a sequence of user interface features used in pairing in accordance with some embodiments.
Figure 2B:
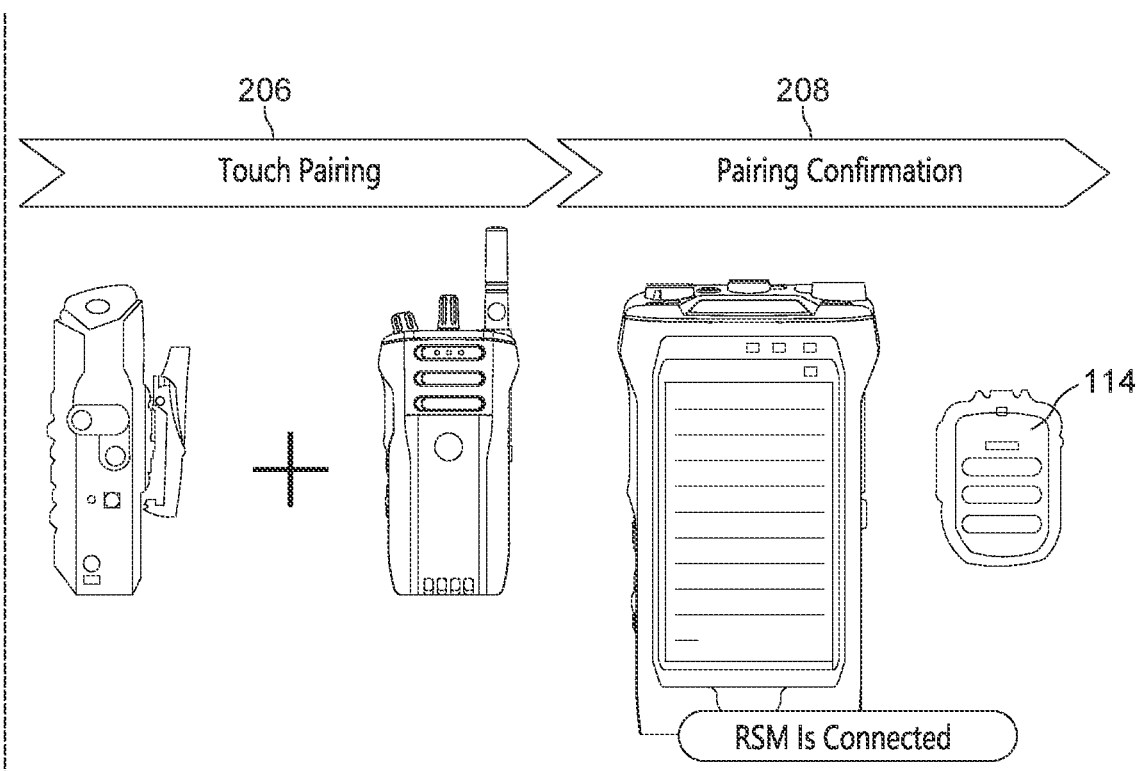

FIGS. 2A and 2B illustrate a sequence of user interface features 200 used in pairing in accordance with some embodiments. Initial pairing 202 may be entered by one of a plurality of user-initiated inputs to the radio device 120. For example, the user-initiated input may be enabled via (1) a programmable button 140a of the radio device (2) a voice command to a microphone 140b of the radio device, wherein the radio device includes ASR capability, (3), a touch menu or (4) a touch-list and/or combination thereof.

At the accessory side, the accessory 110 may begin to provide an indication that the accessory is seeking a host device. For example, a 5 second press of a button of the RSM 110 may result in a periodic beep or an audible announcement of 'searching for a host device' being generated at the accessory. The accessory automatically powers off if no host device is detected. Alternatively, the accessory 110 may be configured to automatically accept pairing operations.

During pairing mode 204, a window will open for a predetermined amount of time, such as 30 seconds, at the radio device 120. A first dialog box (shown as dialog A) will appear during that time indicating that the NFC pairing mode has been activated. For example, the radio device 120 may display "NFC pairing Mode On" at radio user interface display 142. The user interface display 220 will further indicate that transmissions taking place in the background will be temporarily disabled, (e.g. "Background Transmissions Temporarily Disabled During Pairing") or some other similar message. The user interface display 142 will further indicate pairing instructions for the user to perform, such as instructions to hold the devices together (e.g. "Hold Devices Together to Connect" or other similar touch instruction).

At pairing mode 204, if the pairing window at the radio user interface display times out, in response to the timeout timer of processor 130 of FIG. 1, the display will generate a time out message (dialog B) with instructions as to how the user can reopen pairing via a presented dialog or the previously described user inputs. The NFC pairing may be exited in response to a long press of a home button or cancel option on the display or by tapping on the interface outside of the dialog window or in response to a high-priority, high-current event (e.g. emergency button press, PTT button press, high-current receive audio or other mission critical communication event).

The touch pairing 206 represents the devices being held together for both the first BT pairing stage (NFC and BT) and the second BT (BT-only) pairing stage. The radio device detects the accessory and provides a message of "devices connecting" and a series of audible sequential beeps are played out of the RSM 110 along with continuous LED indicators. The devices are held together for a predetermined amount of time required for completion of the proximity requirement for NFC. Low-priority, high-current events are disabled during the NFC pairing. If a high-priority, high-current event takes place during the pairing, then pairing is canceled to ensure that mission critical communications are maintained.

Even after proximity pairing has been completed and the NFC field generator has been disabled, it is preferable to continue to keep the devices together so as to avoid potential user interference with the remaining BT pairing. The user interface continues to provide the indicators (e.g. display 'keep devices together' and continued audible beeps) The user thus views the pairing process as monolithic, and accordingly is less inclined to operate the device during the "second BT pairing stage" in a manner that could disrupt the pairing process, such as initiating a high-priority event like a PTT press unless necessary. Low-priority, high-current background operations are re-enabled when the NFC field generator is disabled and pairing transitions to the BT-only pairing. If a user does initiate a low-priority, high-current event during the BT-only pairing, then the event will be processed and the BT pairing will continue in parallel. Pairing cancellation commands are the only commands that will not be permitted during the BT-only pairing stage. Again, any occurrence of a high-priority, high-current event will also cause an exit of the pairing.

Pairing confirmation 208 indicates that the devices are successfully paired. At the radio device side, a "device connected" transient message (e.g. a two-second toast message) may be displayed. A chime may also be generated by the RSM 110 to indicate completion of the pairing along with an audible "connected" announcement and an LED indicator 114. Hence, user notifications have been dynamically managed to indicate that pairing is complete after the second BT pairing stage and not upon completion of the NFC pairing of the first BT pairing stage, thereby promoting smooth pairing.

Figure 3:
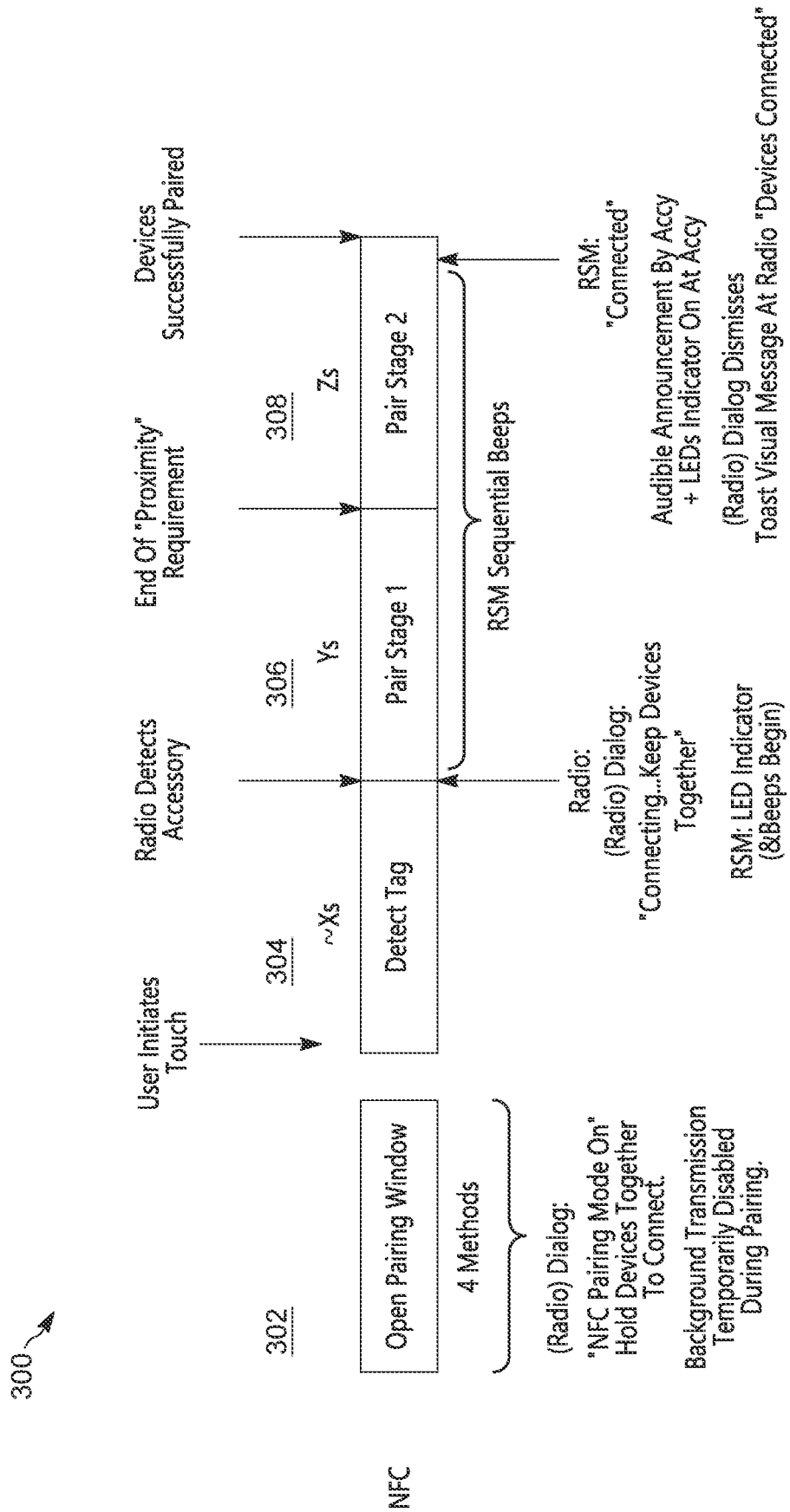
FIG. 3 shows s a series of timing stages for a multi-stage wireless pairing process in accordance with some embodiments.

FIG. 3 represents a series of timing stages for a multi-stage wireless pairing process 300 in accordance with some embodiments for pairing radio device 120 and RSM accessory of FIG. 1. Stage 302 refers to the plurality of user-initiated input options for triggering the opening of the pairing window of the radio device. Once triggered, a dialog window can be seen at the radio device display stating NFC mode is on, along with instructions to hold the devices together.

Stage 304 represents a predetermined amount of time—Xs (for example, one second in an exemplar implementation) allocated for the NFC field generator to detect the corresponding accessory tag. During this time, the LED of the RSM accessory may generate a pulsed on/off indicator (for example, 800 ms on/500 ms off in an exemplar implementation). At the completion of accessory tag detection, the radio device dialog window provides an updated message indicating that the devices are connecting and to keep the devices together. The RSM accessory changes the indicators to a solid continuous LED and a series of audible sequential beeps, in an exemplar implementation.

Stages 306 and 308 respectively represent a first BT pairing stage that uses BT and NFC communication and a second BT pairing stage that uses only BT communication. The series of sequential beeps and continuous LED light generated at the RSM accessory plays throughout both the first BT pairing stage 306 and the second BT pairing stage 308. Likewise, the dialog window of the radio device continues to indicate that the devices are connecting along with instructions to keep the devices together.

The first BT pairing stage 306 perform NFC pairing which requires that the devices be held together for a predetermined amount of time (e.g. approximately five seconds—Ys). During the first BT pairing stage 306, all low-priority, high-current operations are disabled to allow for the higher current needed for the NFC pairing. During this first BT pairing stage 306, the pairing may be canceled via a user initiated cancel command or a high-priority, high-current LMR mission critical event, such as a PTT input to the radio, emergency input to the radio, or high-current receive audio. Upon completion of the first BT pairing stage 306, the NFC field generator of the radio device is disabled Although the NFC proximity requirement is complete at the end of the first BT pairing stage 306, it is still highly desirable that the devices remain held together, so as to avoid user inputs that might interrupt the remainder of the second BT pairing stage 308. Accordingly, the system continues the series of RSM sequential beeps, and continuous LED and provides no indication of the completion of the NFC proximity requirement. This user interface advantageously promotes smooth transition across the pairing.

During the second BT pairing stage 308, even though the NFC field generator has been disabled, it is preferable to not attempt LMR communication for a predetermined amount of time (e.g. approximately 2.9 seconds—Zs) to ensure that the Bluetooth module 134 of the radio device completes pairing with the Bluetooth module of the RSM accessory. The disablement of the high-current drawing NFC field generator of the radio device allows for the enablement of low-priority, high-current events that may occur while the second BT pairing stage 308 is taking place. These low-priority, high-current events preferably take place in the background but may also be user-initiated. User-initiated low-priority, high-current operations typically involve separating the devices and having the user enter an input to the radio, such as an input to make a call. Under such user-initiated operations, the devices remain within the BT pairing range (e.g. less than 10 meters) and the user-initiated low-priority, high-current operation may proceed in parallel with the BT pairing. However, if the user enters a 'cancel' operation during this second BT pairing stage 308, such as by tapping a 'cancel' button or icon, then a message is generated at the dialog window of the radio device indicating that pairing cannot be canceled, except for mission critical radio operations. Again, any occurrence of a high-priority, high-current LMR event will cause an exiting of the second BT pairing stage 308 to service the event. Thus, high-priority, high-current mission critical events (e.g. PTT, emergency, loud LMR receive audio) will always have priority and cause an exiting at any stage of the pairing process.

Upon completion of the second BT pairing stage 308, the RSM accessory generates an audible announcement, such as 'connected', and changes the accessory LED indicator to a brief periodic indicator (e.g. 250 ms on, 250 ms off—two times then stop). The dialog window is dismissed and a pop-up message (also referred to as a toast message) is played at the radio device display confirming that the devices are connected.

Hence, a smooth transition is provided across the multi-stage pairing process 300, from the user-initiated input that triggers pairing 302 through to first and second BT pairing stages 306, 308. The dynamically configured user interfaces (LED, audible beeps, and dialog messages) promote the completion of NFC pairing during first BT pairing stage 306 and prevent cancellation of pairing during the second BT pairing stage 308. The disablement of low-priority, high-current operations during the first BT pairing stage 306 allows the high current NFC pairing to take place. The re-enablement of low-priority, high-current operations during the second BT pairing stage 308 are permissible, as these operations do not interfere with the BT pairing. While the re-enabled low-priority, high-current operations are preferably background operations, it is still possible for a user to enter a user-initiated low-priority, high-current operation during the second BT pairing stage 308. However, any high-priority, high-current mission critical event will take priority during any portion of the multi-stage pairing process, causing an exiting of the pairing, and a servicing of the mission-critical event, thereby ensuring that mission critical operations are maintained.

Figure 4A:
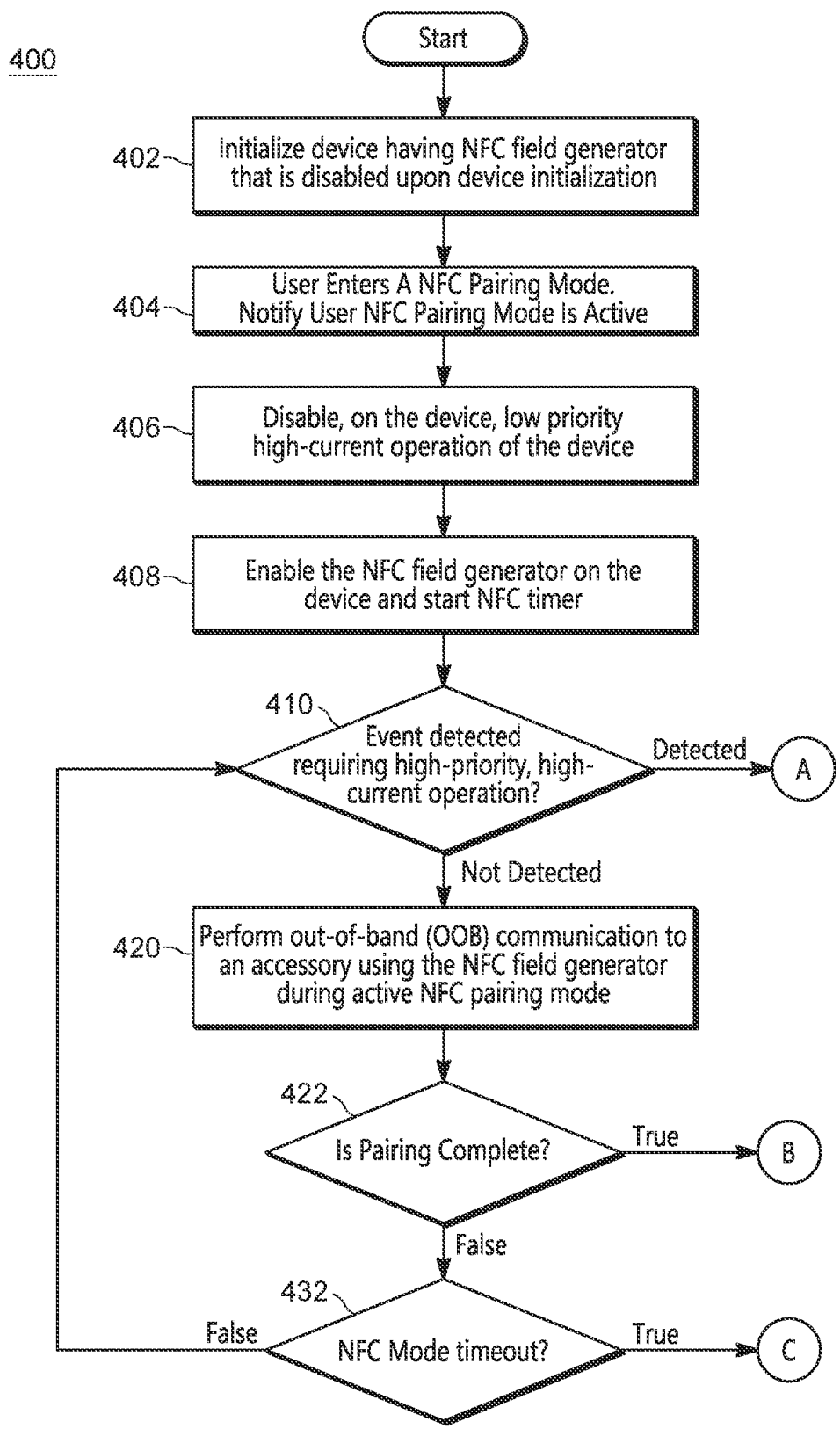
FIGS. 4A, 4B, 4C show a flowchart of a method for wirelessly pairing a portable radio device and an accessory, in accordance with some embodiments.
Figure 4B:
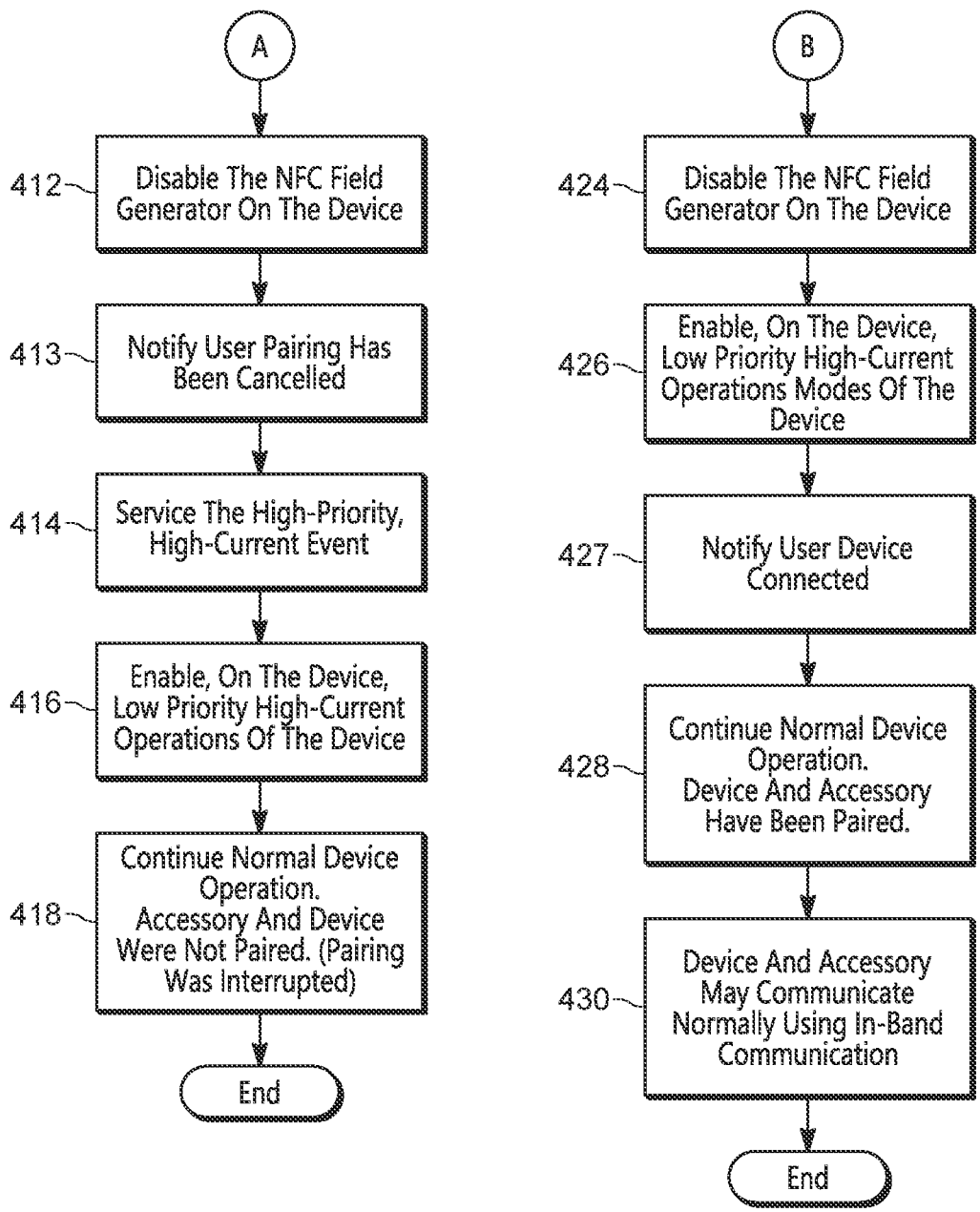
Figure 4C:
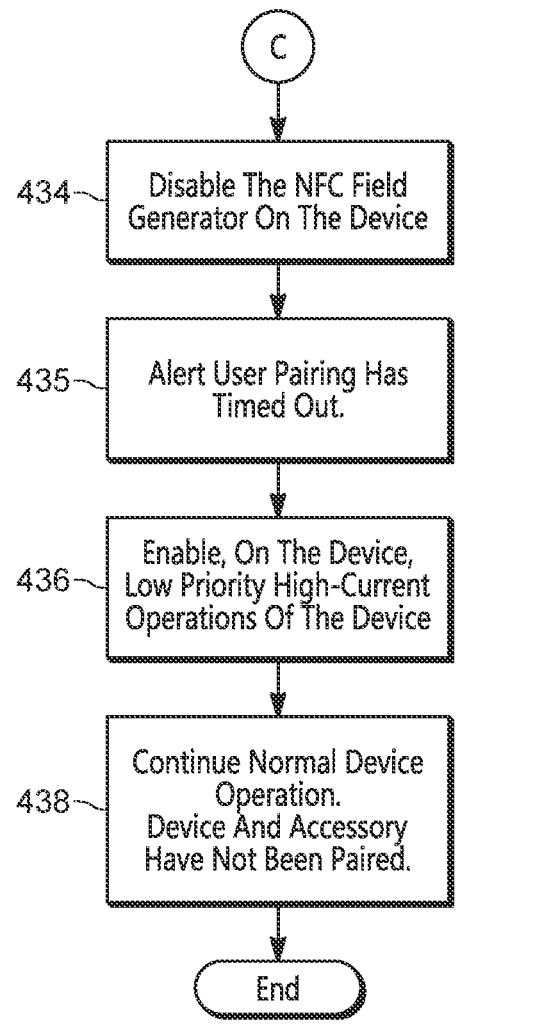

FIG. 4 is a flowchart of a method 400 for wirelessly pairing the portable radio device 120 and an accessory in accordance with some embodiments. The method 400 is provided from the perspective of the portable radio 120 of FIG. 1. The method 400 begins at 402 with initializing the portable radio device. Initialization may be performed, for example, by pressing a power switch of the portable radio device for a predetermined amount of time. The NFC field generator of the portable radio device is disabled during initialization.

At 404, a user-initiated input to the portable radio device triggers entry to a multi-stage wireless pairing process between the portable radio device and an accessory. The multi-stage wireless pairing process includes a plurality of stages including a first BT pairing stage that uses BT and NFC communication and a second BT pairing stage that uses only BT communication. The user-initiated input may be entered at the portable radio device via one or more of the inputs previously described (programmed button, voice command to the radio microphone processed via ASR engine of the processor, selectable menu or icon from a touch screen and/or combination thereof).

Upon entry to first BT pairing stage (BT and NFC), the method at 406 temporarily disables low-priority, high-current operations of the radio device. Low current radio operations, for example low current operations over LTE and/or WiFi, can continue to operate during NFC. The method continues at 408 by enabling the NFC field generator on the radio device and starting an NFC mode timeout timer.

The method may loop through 410, 420, 422, 432, during which time a user may perform a touch pairing operation by bringing together the radio device and accessory within a predetermined proximity to each other (e.g. less than 10 cm for NFC). To assist the user in aligning the device to the very limited range of NFC, directions may be displayed to bring the devices together. The portable radio monitors for high-priority, high-current mission critical events throughout the multi-stage wireless pairing process, such as PTT, emergency, high power receive audio, to name a few). If a high-priority, high-current event is detected at 410, then the method will transition over to 412 (described later). If no high-priority, high-current event is detected at 410, then active NFC pairing is performed using out-of-band communications to the accessory using the enabled NFC field generator at 420. The touch pairing performed at 420 may continue over many loop iterations until pairing is complete as detected at 422 or until the NFC timer times out as detected at 432 or until a high-priority, high-current event is detected at 410. User notifications a are dynamically managed and generated by indicating that pairing is complete after the second BT pairing stage and not before the second BT pairing stage.

If a high-priority, high-current mission critical event is detected at 410, then the method proceeds to 412 to disable the NFC field generator at the radio device, exit the pairing and notify the user that pairing has been canceled at 413, for servicing the high-priority, high-current event at 414. The method will further, at 416, enable low-priority, high-current operations on the radio device, and continue normal radio device operation at 418, without completing the pairing. In other words, pairing is interrupted when a high-priority, high-current event occurs. The interruption in NFC pairing advantageously ensures that mission critical radio device functions are prioritized and acted upon by the radio.

When a determination is made within the loop that the NFC pairing is complete at 422, the method continues to 424 with the second BT pairing stage by disabling the NFC field generator at the radio device, enabling low-priority, high-current operation modes of the radio device at 426 (e.g. call alerts, over the air rekey (OTAR), private call, or other radio functions that were temporarily disabled), and notifying the user that the device is connected 427. Normal device operation continues at 428 with the device and accessory being paired. The wirelessly paired radio device and accessory then communicate normally using in-band BT communication at 430.

If the NFC mode timeout timer expires without completion of NFC pairing at 432, then the method continues by disabling the NFC field generator at the radio device at 434, notifying the user that pairing has timed out 435, and by further re-enabling low-priority, high-current operation modes of the radio device at 436 (e.g. call alerts, OTAR, to name a few). Normal LMR radio device operation continues at 438 without pairing to the accessory.

User notifications may be dynamically managed and generated throughout method 400 to promote keeping the devices together. The notifications provide monolithic indicator(s) throughout the first BT pairing stage and the second BT pairing stage indicating that the devices are connecting and to keep the devices together. An indication that pairing is complete is preferably generated only after the second BT pairing stage, and not before the second BT pairing stage. This approach advantageously promotes smooth pairing and helps avoid potential user interference with the pairing. Device 120 may implement additional logic (not shown) immediately prior to step 404. Additional logic may be imposed to conditionally enter step 404. For example, if device 120 is presently in a high current mode upon entry to step 404, it is desirable to either block or delay entry into step 404 to ensure the near field module is not enabled at the same time as a high current mode.

The method 400 of pairing a portable radio to an accessory may be summarized as comprising: entering a multi-stage wireless pairing mode between the portable radio device and an accessory, wherein the multi-stage wireless pairing mode is triggered by a user-initiated input, and the multi-stage wireless pairing mode includes a first BT pairing stage that uses BT and NFC communication, and a second BT pairing stage that uses only BT communication; temporarily disabling low-priority, high-current operations during the first BT pairing stage; monitoring for high-priority, high-current mission critical events during the multi-stage wireless pairing mode; re-enabling low-priority, high-current operations during the second BT pairing stage; generating a user notification indicating that pairing is in process during the first and second BT pairing stages, and generating a different notification in response to successful completion of the second BT pairing stage; exiting the multi-stage wireless pairing mode in response to a high-priority, high-current event occurring during either the first BT pairing stage or the second BT pairing stage and servicing the high-priority, high-current event; and exiting the multi-stage wireless pairing mode, and begin wireless BT communications between the portable radio device and accessory, in response to completion of both the first BT pairing stage and the second BT pairing stage.

Further exiting conditions include: exiting the multi-stage wireless pairing mode in response to a NFC timeout timer expiring during the first pairing stage; exiting the multi-stage wireless pairing mode in response to a user initiated input indicative of pairing cancelation during the first pairing stage but not during the second pairing stage.

Accordingly, there has been provided a system and method that allows NFC pairing operation of a current constrained radio device to an accessory, without negatively impacting mission critical functionality. The multi-stage pairing approach provided by the embodiments, provide for a first pairing stage that facilitates touch pairing of devices via the use of NFC for pairing, while overcoming the current spike challenges associated with applying NFC to portable radios having LMR functionality. Low-priority, high-current operations are disabled from taking place during the NFC pairing, and any detection of high-priority, high-current operations during the NFC pairing will immediately disable the NFC pairing and service the mission critical event, thereby ensuring that mission critical operations are maintained. Low-priority, high-current operations may be re-enabled during the second pairing stage, as the NFC pairing has been turned off. Only high-priority, high-current mission critical events will cause the second pairing stage to be canceled. Successfully paired devices communicate over BT communication to provide wireless audio at the connected accessory. User notifications are dynamically managed to promote a smooth pairing process to avoid user interference with the pairing. The approach provided by the embodiments avoids the use of proprietary pairing protocols, thereby further facilitating the ability to wirelessly pair public safety devices such as RSMs as well COTS accessories.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A portable communication system, comprising:
   a portable radio device having a processor configured to:
      manage land mobile radio (LMR) communications and non-LMR communications, the LMR communications including mission critical communications and non-mission critical communications;
      enter a multi-stage wireless pairing mode between the portable radio device and an accessory, wherein the multi-stage wireless pairing mode is triggered by a user-initiated input, and the multi-stage wireless pairing mode includes a first Bluetooth (BT) pairing stage that uses BT communication and near-field communication (NFC), and a second BT pairing stage that uses only BT communication;
      monitor for high-priority, high-current mission critical events during the multi-stage wireless pairing mode;
      temporarily disable low-priority, high-current operations during the first BT pairing stage;
      re-enable low-priority, high-current operations during the second BT pairing stage;
      generate a user notification indicating that pairing is in process during the first and second BT pairing stages, and generate a different notification in response to successful completion of the second BT pairing stage;
      exit the multi-stage wireless pairing mode in response to a high-priority, high-current mission critical event occurring during either the first BT pairing stage or the second BT pairing stage and service the high-priority, high-current mission critical event; and
      exit the multi-stage wireless pairing mode, and begin wireless BT communications between the portable radio device and accessory, in response to completion of both the first BT pairing stage and the second BT pairing stage.

2. The communication system of claim 1, wherein the processor is further configured to:
   exit the multi-stage wireless pairing mode in response to a NFC timeout timer expiring during the first pairing stage; and
   exit the multi-stage wireless pairing mode in response to a user initiated input indicative of pairing cancelation during the first BT pairing stage but not during the second BT pairing stage.

3. The portable communication system of claim 1, wherein the processor is configured to:
   turn on a NFC field generator during the first BT pairing stage; and
   turn off the NFC field generator during the second BT pairing stage.

4. The portable communication system of claim 1, wherein the accessory generates a series of audible beeps throughout both the first BT pairing stage and the second BT pairing stage.

5. The portable communication system of claim 4, wherein the accessory and portable radio device generate audible and visual indications that the portable radio device and accessory are successfully paired after completion of the second BT pairing stage.

6. The portable communication system of claim 1, wherein the user-initiated multi-stage wireless pairing mode is enabled by one of:
  a programmable button of the portable radio device;
  a voice command to the portable radio device, wherein the portable radio device includes automatic speech recognition (ASR) capability;
  a dedicated BT button press interface; and
  a BT menu display that includes a NFC touch pairing option.

7. The portable communication system of claim 1, wherein the portable radio device is a converged portable radio device providing the LMR communication and non-LMR communication.

8. The portable communication system of claim 7, wherein the non-LMR communication comprises at least one of:
  WiFi communication; and
  long term evolution (LTE) communication.

9. The portable communication system of claim 8, wherein the low-priority, high-current operations are determined based on operational environment of the portable radio device, portable radio device settings, portable radio device configuration, operational mode of the portable radio device, active WiFi modem of the portable radio device, active LTE modem of the portable radio device.

10. The portable communication system of claim 9, wherein during the second BT pairing stage of the multi-stage pairing mode, the processor is further configured to:
  not permit user-initiated inputs to cancel pairing;
  re-enable low-priority, high-current operations; and
  exit the second BT pairing stage only in response to high-priority, high-current mission critical events.

11. The portable communication system of claim 1, wherein high-current operations of the portable radio device in conjunction with NFC communication exceed a current sourcing capability of a battery of the portable radio device.

12. The portable communication system of claim 1, wherein the portable radio device is a converged LMR device having a BT module and an NFC module, and the accessory is a remote speaker microphone (RSM) having a BT module and an NFC module.

13. The portable communication system of claim 1, wherein the accessory is a commercial-off-the-shelf (COTS) accessory having both BT and NFC.

14. The portable communication system of claim 1, wherein the portable radio device comprises one of:
  a Div1certified portable land mobile radio (LMR) device;
  an ATEX certified portable LMR device; and
  a portable LMR device operating with diminished current capacity.

15. A method of pairing a portable radio device to an accessory, comprising:
  entering a multi-stage wireless pairing mode between the portable radio device and an accessory, wherein the multi-stage wireless pairing mode is triggered by a user-initiated input, and the multi-stage wireless pairing mode includes a first Bluetooth (BT) pairing stage that uses BT communication and near-field communication (NFC), and a second BT pairing stage that uses only BT communication;
  temporarily disabling low-priority, high-current operations during the first BT pairing stage;
  monitoring for high-priority, high-current mission critical events during the multi-stage wireless pairing mode;
  re-enabling low-priority, high-current operations during the second BT pairing stage;
  generating a user notification indicating that pairing is in process during the first and second BT pairing stages, and generate a different notification in response to successful completion of the second BT pairing stage;
  exiting the multi-stage wireless pairing mode in response to a high-priority, high-current mission critical event occurring during either the first BT pairing stage or the second BT pairing stage and service; and
  exiting the multi-stage wireless pairing mode, and begin wireless BT communications between the portable radio device and accessory, in response to completion of both the first BT pairing stage and the second BT pairing stage.

16. The method of claim 15, further comprising:
  exiting the multi-stage wireless pairing mode in response to a NFC timeout timer expiring during the first pairing stage; and
  exiting the multi-stage wireless pairing mode in response to a user initiated input indicative of pairing cancelation during the first pairing stage but not during the second pairing stage.

17. The method of claim 15, further comprising:
  turning on and NFC field generator during the first BT pairing stage; and
  turning off the NFC field generator during the second BT pairing stage.

18. The method of claim 15, further comprising:
  generating a series of audible beeps throughout both the first BT pairing stage and the second BT pairing stage, without generating any additional indicators upon completion of the first pairing stage.

19. The method of claim 15, generating audible and visual indicators that the portable radio device and accessory are paired after completion of the second BT pairing stage.

20. The method of claim 15, wherein the portable radio device is a converged land mobile radio (LMR) device having a Bluetooth module and an NFC module, and the accessory is a remote speaker microphone (RSM) accessory having a BT module and an NFC module.

21. The method of claim 15, wherein the accessory is a commercial-off-the-shelf (COTS) accessory having both BT and NFC.

22. The method of claim 15, wherein the portable radio device comprises one of:
  a Div1certified portable land mobile radio (LMR) device;
  an ATEX certified portable LMR device; and
  a portable LMR device operating with diminished current capacity.

23. A portable radio, comprising:
  a battery having a predetermined battery capability for sourcing a predetermined current limit;
  a near-field radio module for wireless pairing;
  a far-field radio module for wireless pairing;
  a user interface providing indicators of a wireless pairing status;
  a processor operatively coupled to the near-field radio module and the far-field radio module and powered by the battery, the processor configured to:

disable low-priority, high-current (LPHC) radio operations during a first pairing stage in which a combined near-field radio module current, far-field radio module current, and LPHC radio operational current exceed the predetermined current limit of the battery;
re-enable LPHC radio operations during a second pairing stage during which the near-field radio module current decreases, and wherein the
combined near-field radio module current, far-field radio module current, and LPHC radio operational current do not exceed the predetermined current limit of the battery; and
present a monolithic indicator to the user interface throughout the first and second pairing stages.

\* \* \* \* \*